United States Patent Office 3,060,049
Patented Oct. 23, 1962

3,060,049
BARIUM METABORATE-SILICA PARTICLES AND
METHODS OF PREPARING SAME
Stanley J. Buckman, Raleigh, and John D. Pera, Memphis, Tenn., assignors to Buckman Laboratories, Inc., Memphis, Tenn., a corporation of Tennessee
No Drawing. Filed Jan. 24, 1962, Ser. No. 168,518
11 Claims. (Cl. 106—306)

This invention relates to a barium metaborate pigment in particulate form. More particularly, it relates to a pigment that has improved properties in respect to hygroscopic and non-caking tendencies, reduced solubility in water, and exhibits little or no tendency to form large crystalline hydrates by growth in water.

Barium metaborate in particulate form has been used in paint compositions as a preservative pigment. Certain problems, however, have been encountered in such use. These problems have been related in part to the degree of water solubility of barium metaborate. Barium metaborate, because of its water solubility, as heretofore available, could not be used in most water emulsion paints because of its incompatibility with the emulsion paint latex. Barium metaborate also exhibits the undesirable property of forming large crystalline hydrates by growth in water.

Processes have heretofore been disclosed for the coating of particles of water-soluble salts, such as ammonium nitrate, with small proportions of liquid sodium silicates which were added to the ammonium nitrate and the entire mixture dried together to produce a product resistant to caking. Particles of water-insoluble pigments such as zinc sulfide and lithopones have also been coated with greater proportions of liquid sodium silicates, and with uncalcined amorphous gel-like silica and water-insoluble alkaline earth metal silicates, produced by reaction of a liquid sodium silicate with acids and water-soluble alkaline earth metal salts, respectively. The purpose of such coatings was usually to increase the hiding power of the pigments in paint vehicles. R. K. Iler, U.S. Patent No. 2,885,366, dated May 5, 1959, teaches a process whereby certain materials may be coated with silica. The materials to be coated may be either inorganic or organic and should be water insoluble. Iler defines "water insoluble" for the purposes of his disclosure as meaning not more than 0.1 percent of the material is soluble in water at 25° C. For reasons which will appear obvious from the description hereinafter, none of the prior known processes is adaptable to the coating of barium metaborate particles to produce the pigments of the present invention.

It is accordingly a principal object of the present invention to provide a barium metaborate pigment in particulate form, which product obviates the disadvantages of the prior art compositions of this character.

It is another object of our invention to provide barium metaborate in a form in which it is less hygroscopic, less susceptible to extraction by water, and less susceptible to the formation of larger crystalline hydrates by growth in water, than products heretofore available.

It is another object of the present invention to provide a composition which does not cake when stored as a dry product.

These and other objects and advantages of our invention will become apparent as the description proceeds.

To the accomplishment of the foregoing and related ends, this invention then comprises the features hereinafter full described and particularly pointed out in the claims, the following description setting forth in detail certain illustrative embodiments of the invention, these being indicative, however, of but a few of the various ways in which the principle of the invention may be employed.

Broadly stated, the foregoing objectives and advantages are attained by employing a pigment in particulate form, having an effective diameter of less than 40 microns, wherein the pigment comprises a hydrated barium metaborate and a polymerized, amorphous, hydrated silica. The polymerized silica contains both Si—OH and Si—O—Si bonds. As to the actual composition of the product, that may vary as follows: BaO content 50 to 65 parts $B_2O_3$ content 20 to 30 parts, and silica 3 to 20 parts. As another characteristic the solubility of the product may vary from 0.1 to 0.3 part per 100 parts of water at 25° C. The water extract so obtained contains from 0.05 to 0.20 percent barium expressed as BaO, from 0.023 to 0.091 percent boron expressed as $B_2O_3$, and at least 0.005 percent silica, all being percentages by weight.

The product of this invention in a preferred embodiment thereof may be formed by the percipitation of barium metaborate from a reaction mixture of barium sulfide and borax in the presence of liquid sodium silicate. When this procedure is followed, we have found it desirable to add a soluble zinc salt to the filtered wet product before drying, which serves to react with any sulfide present, forming an insoluble and inert zinc sulfide.

Alternately and somewhat less preferable, the product of this invention may be prepared by contacting barium metaborate particles with liquid sodium silicate in an aqueous environment.

In either case, to the best of our knowledge the barium metaborate particles become partially coated with amorphous hydrated silica, which is a discontinuous coating.

It would be logical to expect the formation of a substantial amount of barium silicate by reacting a water soluble barium metaborate with an aqueous solution of a sodium silicate. It has been found, however, that the amount of barium silicate so formed is insignificant as determined by either X-ray or infrared analytical procedures. Barium metaborate treated with sodium silicate by our processes, still contains barium metaborate in a chemically unchanged state. Both infrared spectra and X-ray diffraction patterns, as well as analyses for BaO and $B_2O_3$ indicate that the crystal lattice structure of the hydrated barium metaborate still exists in silica treated barium metaborate. We, therefore, believe that the silicate is present as a partially polymerized, amorphous, hydrated silica. The barium metaborate is bound by hydrogen bonds to the silica which is present principally in the form of silanol linkages (Si—OH). In addition to the silanol linkages, Si—O—Si bonds are also present. Furthermore, this silica seems to be on the surface of the barium metaborate particle, because if it were inside the crystal lattice, the X-ray diffraction patterns would probably be altered. We wish to point out, however, that the silica coating is not a completely inactive entity. In water, it is being depolymerized by the alkaline system and repolymerized by the presence of dissolved salts. There is no doubt the equilibria are established in the aqueous medium but the exact nature of these equilibria are not known. The silica in silica coated barium metaborate is resistant to alkaline solubility effects. It has been noted also that the amount of silica extracted is higher in the product that has been heated to 700° C. and made anhydrous than the unheated product. The observed solubility change, however, indicates that the heating breaks the hydrogen bonding between the silica and barium metaborate portions of the composition. According to the literature such a heat treatment should decrease the solubility of the silica in alkali. Silica treated barium metaborate for that reason is particularly suited for use in paints which are generally alkaline. Examination of the barium metaborate treated in accordance to our invention shows that it has no infrared absorption at 2900 cm.$^{-1}$ until it is heated at 700° C. After it has been heated to 700° C., a small band appears which is probably due to absorption by siloxane bonds (Si—O—Si) formed by the heating process. It therefore, follows that in our barium metaborate treated with silica by our invention, we have silica in the form of silanol (Si—OH) which is hydrogen bonded to the oxygen in the barium metaborate portion of the composition.

It does not appear that the silica merely forms a film on the barium metaborate thereby reducing the solubility of the metaborate. Evidence to this effect follows from the fact that particles of barium metaborate which have been coated with sodium silicate by merely immersing such particles in an aqueous solution of a liquid sodium silicate and then drying the total mixture are unsatisfactory for the purposes of this invention. As a rule, we have found that when barium metaborate has been coated with a sodium silicate in this manner, the resulting product does not have the desired reduction of water solubility. In addition, we have found that other barium borates, such as hydrates of barium tetraborate and barium sesquiborate, even when treated by the methods enumerated herein, cannot be effectively coated with the silica. Further, when such borates have been so treated, they do not exhibit the desirable characteristics of the products of this invention in regard to resistance to moisture absorption, to caking, and to extraction by water, and to the formation of larger particles of crystalline hydrates by growth in water.

The barium metaborate particles prepared by our invention possess what we prefer to call a "controlled" solubility in water. That is, the solubility of the final product is between 0.1 and 0.3 part per 100 parts of water at 25° C. provided sufficient time is allowed in the solubility determination to establish equilibrium. When this determination is made using good agitation, equilibrium usually is reached in 2 hours and does not change with time. This is true regardless of the actual size of the particles when the dimensions of the particles are less than 40 microns in diameter.

Before proceedeing with specific examples illustrating our invention, we wish to indicate in general the nature of some of the materials required in the process.

The alkali metal silicates which may be used in the processes of our invention include the liquid water soluble silicates having a ratio of alkali metal to silica of at least 2.5 grams of silica to each gram of alkali metal calculated as alkali metal oxide. Commercially available products are the liquid silicates of sodium and potassium, having ratios by weight of alkali metal oxide to silica up to 1:3.75 for sodium silicates, and up to 1:2.50 for potassium silicates, but known liquid sodium silicate having a ratio of sodium oxide to silica of 1:4.10 may also be used. In addition, liquid potassium silicate having a ratio of 1 part $K_2O$ to 2.50 parts $SiO_2$ by weight may be used. The preferred liquid silicates, however, are sodium silicates having ratios between 3.22 and 3.75 grams of silica to each gram of sodium oxide ($Na_2O$), and particularly a sodium silicate which is an aqueous fluid or liquid containing 25.3 percent by weight of silica ($SiO_2$) and 6.75 percent sodium calculated as sodium oxide ($Na_2O$) which has a ratio of $Na_2O:SiO_2$ of 1:3.75, and is used in the examples listed below.

Suitable barium metaborates include barium metaborate monohydrate and polyhydrated forms thereof. In either case the barium metaborate used must be one in particulate form, that is, it should be of such size that the product after treatment with the liquid silicate has a diameter not exceeding 40 microns. When the preferred procedure is employed, the barium metaborate is prepared in situ. In this case the barium metaborate is prepared by precipitation from barium sulfide and borax, and the liquid silicate may be added in solution or suspension with either of these reactants, or after both of the reactants have been added, or the reactants may be added directly to a solution of the alkali metal silicate. Furthermore, the alkali metal silicate may be added during the preparation of barium metaborate from other reactants, which include barium hydroxide and other water soluble barium salts and boric acid or other water soluble borates.

Somewhat more specifically and in somewhat greater detail, the process may be described as follows:

In coating the particles of barium metaborate effectively it is advantageous to have the liquid alkali metal silicate distributed as uniformly as possible over the surfaces of the particles. For this purpose sufficient water should be present to produce a slurry that can be stirred easily and the amount should be such as not to dilute the liquid alkali metal silicate excessively.

The slurry of barium metaborate particles in water containing the liquid alkali metal silicate is then heated for a period such that an adherent coating is formed on the particles of barium metaborate. This can be generally accomplished by heating for a period of between 1 to 6 or more hours at a temperature between about 75° and 200° C. It should be understood, however, that a heating period of 1 to 6 hours is merely a preferred range as good yields of a satisfactory product have been obtained when the heating period was less than 30 minutes. This treatment binds the silica to the barium metaborate particles and extracts residual soluble alkali metal salts that were introduced with the liquid alkali metal silicate.

Heating an aqueous slurry of silica coated barium metaborate particles at a temperature of 200° C. or lower for periods longer than 6 hours appears to produce no further change in the characteristics of the product. It is impossible to produce by this process silica coated barium metaborate particles that are completely insoluble in water.

The heating and agitating of the slurry serves to break up aggregated particles. When the barium metaborate is being prepared by precipitation in the presence of liquid alkali metal silicates, the presence of the latter serves to control the size of the particles being formed.

The products obtained by the processes of this invention are distinguished from uncoated barium metaborate particles similarly precipitated by their comparative freedom from aggregated particles. The dried particles are freer-flowing, less subject to caking, less hygroscopic, less soluble in water and have a lesser tendency to form crystalline hydrates by growth in water than uncoated barium metaborates particles.

The nature of the coating of silica that is produced on the barium metaborate particles by the processes of the present invention has not been established conclusively. It can be stated, however, that it is not a dense coating. Furthermore, it is pervious to water. The barium metaborate particle that is coated has been established by X-ray diffraction examination to be crystalline and identical with otherwise uncoated barium metaborate. In addition, the unchanged X-ray diffraction pattern of the coated barium metaborate indicates that the silica is present in an amorphous state.

The alkali metal content of the coated barium metaborate particles is always less than the amount of alkali metal contained in the liquid alkali metal silicate that had been added to the barium metaborate. In all cases the alkali metal content is less than 15 percent of the weight of the silica coating deposited on the particle, the amount varying with the degree of heating and washing to which the particular coated particles have been subjected.

Barium metaborate particles that have been coated by processes of this invention with between 3 and 25 percent of their weight of silica and having a size not greater than 40 microns in diameter are particularly useful as preservative pigments in paints. This includes oil paints in which uncoated barium borates are successfully used and, in addition, water emulsion paints. Uncoated barium metaborate is too soluble in water emulsion paints to be used therein successfully. Generally uncoated barium borates are incompatible with many of the latexes used in such paints. Furthermore, the resistance or inability of the silica coated barium metaborate to grow by formation of larger hydrated crystalline particles makes these products eminently suitable for use in water emulsion paints.

Particles of barium metaborate coated by the processes of our invention with amounts of silica varying between 3 and 25 percent by weight (based on the barium metaborate which correspond to approximately 3 to approximately 20 percent by weight of the coated pigment) when extracted with water at 25° C., will yield extracts that contain dissolved solids in a proportion between 0.1 and 0.3 percent by weight of the extract, and which do not vary substantially from 0.2 percent by weight of the extract, the midpoint of this range. These extraction results are remarkably uniform and consistent over the entire range of 3 to 20 percent silica (based on the weight of pigment), regardless of the size of the particles, insofar as they are not more than 40 microns in diameter. On the other hand, when barium metaborate particles are coated with less than 3 percent by weight of silica, their extracts in water contain between 0.3 and 0.8 percent by weight of dissolved solids, and the proportions vary more widely and directly with the proportion of silica present on the particles.

Barium metaborate particles coated with between 3 to 25 percent by weight of silica are easier to disperse in paint mills than is uncoated barium metaborate. Particles having diameters less than 40 microns do not disintegrate or fracture appreciably in point dispersing mills or rolls and retain all their essential characteristics. The particle size can be controlled by variations in the initial precipitation or by using particles of barium metaborate that have been screened or classified or preliminarily ground to a size suitable for coating. The processes of this invention are directed particularly to the production of particles having a diameter of not more than 40 microns after coating.

When particles of barium metaborate have been coated by the processes of our invention with silica and are extracted with water as described herein, the first and subsequent extracts will not differ substantially and will contain not more than 0.3 percent by weight of dissolved solids. Higher percentages of total solids found in the extract are indicative primarily of particles of barium metaborate that have not been adequately coated or whose silica coating has been abraded, exposing barium metaborate surfaces, for example, a powder which has been subjected to uncontrolled grinding after drying, in which the particles may be fractured or their coatings partially removed. Residues of mother liquors from which the particles were separated before drying, or inadequate washing before drying, may also be responsible for a higher solids content of the first extract. Generally, however, all such soluble and uncoated partially coated particles in the product sample are removed in the first and second extractions and the third and subsequent extracts have a lower and consistent solids content.

In order to disclose the nature of the present invention still more clearly, the following illustrative examples will be given. It is to be understood that the invention is not to be limited to the specific conditions or details set forth in these examples except insofar as such limitations are specified in the appended claims.

EXAMPLE 1

Into a 5000 gallon steam-jacketed stainless steel reactor provided with an agitator and containing 35,540 pounds of barium sulfide solution assaying 14.29 percent BaS maintained at a temperature of 57° C. were added 4,316 pounds of sodium tetraborate pentahydrate

$$(Na_2B_4O_7 \cdot 5H_2O)$$

and 1,778 pounds of liquid sodium silicate containing 25.3 percent of $SiO_2$. Following a heating period of 1 hour and 50 minutes at 120° C. the batch was transferred to a holding tank. The reaction product, which was a slurry, was filtered on a rotary vacuum filter and then after thoroughly washing with hot water, the filter cake was transferred to a dryer by means of a belt conveyor. While thus being transferred, the cake was continuously sprayed with an aqueous solution of zinc sulfate so as to provide a concentration of 0.15 percent of zinc in the final dried product.

The resulting white product had the following characteristics:

Chemical analysis, percent by weight:
  BaO 61.0; $B_2O_3$ 26.6; $SiO_2$ 6.2; $H_2O$ 5.15; S(sulfide) 0.15.
Solubility 0.25.
Coarser than 44 microns 0.28.
Amount of hydrogen sulfide evolved in aqueous solution: Trace.

EXAMPLE 2

To a jacketed stainless steel autoclave heated electrically were added with continual stirring 598.3 grams of a 16.5 percent barium sulfide solution (equivalent to 0.583 mole of BaS) that had been warmed to 70° C. and 83 grams of commercial borax pentahydrate which, based on its assay, was equivalent to 0.291 mole of

$$Na_2B_4O_7 \cdot 5H_2O$$

followed by 46.8 grams of liquid sodium silicate A ($Na_2O:3.75SiO_2$ containing 25.3 percent of $SiO_2$), which mixture was maintained with stirring and heating at 70° C., while precipitation progressed. The autoclave was then sealed and the heating rate was increased so that the mixture reached a temperature of 125° C. in 15 minutes, at which point the temperature was maintained between 125° and 140° C. with stirring for a period of three more hours. The autogenous pressure that developed during this period varied between 20 to 40 pounds per square inch (superatmospheric). At the end of this period, cold water was charged into the jacket of the autoclave in such amounts as to cool the mixture in the autoclave to 70° C. within a period of 20 to 25 minutes. The mixture was then transferred while still at this temperature to a Buechner funnel and filtered with suction. The filtrate weighed 496.7 grams. The filter cake was then washed with 1000 milliliters of cold water and sucked dry, then placed in an oven maintained at 140° to 150° C. to dry overnight. The filter cake weighed 231.4 grams before being placed in the oven.

The product was a homogeneous, free-flowing white solid, the particles of which were ground in a mortar and pestle to pass a 100-mesh screen.

The total weight of the dried product was 141.2 grams and it had a water content of 5.00 percent by weight that was still retained in the product.

Analysis of the product (converted to water-free basis) gave the following results in percentages by weight:
  BaO 65.7; $B_2O_3$ 30.20; $SiO_2$ 6.77; Na 0.22; S, 0.13.

The ratio of barium oxide (BaO) to boron oxide ($B_2O_3$) by weight in the product was 2.18:1; the calculated ratio of BaO:$B_2O_3$ in BaO·$B_2O_3$ is 2.20:1.

The susceptibility of the product to extraction by water was determined by placing 5.0 grams of the product into 100 milliliters of water contained in a stoppered polyethylene bottle and shaking the suspension for two hours at prevailing room temperature. Thereafter the clear solution or extract was drawn off, and a second quantity of 100 milliliters of water was added and the mixture was shaken for an additional two hours. The two successive extracts were analyzed for barium, boron, and silica. The following results, expressed as grams per 100 milliliters of the respective extracts, were obtained:

|  | First extract, grams per 100 milliliters | Second extract, grams per 100 milliliters |
| --- | --- | --- |
| Total solids | 0.23 | 0.25 |
| BaO | 0.13 | 0.11 |
| $B_2O_3$ | 0.060 | 0.065 |
| $SiO_2$ | 0.014 | 0.013 |

The pH of the extracts were respectively 10.2 and 10.3. Under the same conditions, pure barium metaborate dissolves to the extent of approximately 0.8 gram (calculated as $BaO \cdot B_2O_3$) per 100 milliliters of aqueous solution and the saturated solution has a pH of approximately 11.3.

EXAMPLE 3

In the same manner as described in preceding Example 2, 410.0 grams of a 15.5 percent barium sulfide solution (equivalent to 0.378 mole of BaS), 53.8 grams of commercial borax pentahydrate which, based on its assay, was equivalent to 0.189 mole of $Na_2B_4O_7 \cdot 5H_2O$, and 14.9 grams of liquid sodium silicate A were added to the autoclave and heated at 70° C. while precipitation progressed. It was then heated between 125° and 140° C. for 3 hours at these temperatures and recovered as described in Example 2.

After filtration, the filtrate weighed 358.3 grams; the wet filter cake weighed 119.4 grams. After drying the product, it weighed 82.1 grams (containing 6.02 percent water) and its physical characteristics were essentially the same as those of the product of Example 2, from which it differed principally only in its lower silica content.

Analysis of the product (converted to water-free basis) gave the following results in percentages by weight:
BaO 66.5; $B_2O_3$ 31.55; $SiO_2$ 5.26; Na 0.29; S 0.43.
Ratio of BaO: $B_2O_3$ by weight in product: 2.11:1.

Extraction of the product thus prepared with water, as described hereinbefore, yielded the following results:

|  | First extract, grams per 100 milliliters | Second extract, grams per 100 milliliters |
| --- | --- | --- |
| Total solids | 0.23 | 0.20 |
| BaO | 0.13 | 0.12 |
| $B_2O_3$ | 0.050 | 0.048 |
| $SiO_2$ | 0.018 | 0.014 |
| pH of extract | 10.4 | 10.1 |

EXAMPLE 4

In the same manner as described in preceding Example 2, 320.3 grams of a 16.6 percent barium sulfide solution (equivalent to 0.314 mole of BaS), 44.7 grams of commercial borax pentahydrate which, based on its assay, was equivalent to 0.157 mole of $Na_2B_4O_7 \cdot 5H_2O$, and 49.6 grams of liquid sodium silicate A were added to the autoclave and heated at 70° C. while precipitation progressed and then for 3 hours at 125° to 140° C. as in preceding Example 2. The product was recovered as described in Example 2.

After filtration, the filtrate weighed 219.4 grams; the wet filter cake weighed 160.1 grams. The dried product (containing 7.59 percent water) weighed 79.1 grams and its physical characteristics were essentially the same as those of the product of Example 2, from which it differed principally only in its higher silica content.

Analysis of the product gave the following results in percentages by weight, converted to a water-free basis:
BaO 62.85; $B_2O_3$ 28.10; $SiO_2$ 12.24; Na 0.40; S 0.12.
Ratio of BaO:$B_2O_3$ by weight in product: 2.24:1.

When the product was extracted with water as described hereinbefore, the results were as follows:

|  | First extract, grams per 100 milliliters | Second extract, grams per 100 milliliters |
| --- | --- | --- |
| Total solids | 0.18 | 0.20 |
| BaO | 0.10 | 0.11 |
| $B_2O_3$ | 0.041 | 0.041 |
| $SiO_2$ | 0.027 | 0.025 |
| pH of extract | 10.2 | 10.2 |

EXAMPLE 5

Into a flask containing 500 milliliters of water were added with constant stirring 100 grams of solid particulate barium metaborate (ratio $BaO:B_2O_3$, 2.20:1) and 33 grams of liquid sodium silicate A. The mixture was heated with constant stirring at 100° C. for 5 hours, after which it was cooled to 70° C. and filtered. The weight of the filtrate was 520 grams and the wet filter cake weighed 199 grams. After drying, the product weighed 107 grams (containing 5.4 percent water) and in its physical characteristics it was the equivalent of the product of Example 2.

Analysis of the product (not converted to a water-free basis) gave the following results in percentages by weight:
BaO 58.2; $B_2O_3$ 24.9; $SiO_2$ 10.6; $H_2O$ 5.40; Na 0.10.
Ratio of BaO: $B_2O_3$ by weight in the product: 2.34:1.

Extraction of the product with water gave the following results:

|  | First extract, grams per 100 milliliters | Second extract, grams per 100 milliliters |
| --- | --- | --- |
| Total solids | 0.32 | 0.30 |
| BaO | 0.150 | 0.132 |
| $B_2O_3$ | 0.076 | 0.065 |
| $SiO_2$ | 0.011 | 0.016 |
| Na | 0.001 |  |
| pH of extract | 10.1 | 10.1 |

*Example 6*

Into a 300 gallon steam jacketed stainless steel reactor provided with a stirrer containing 2060 pounds of barium sulfide solution assaying 15.15 percent BaS (1.84 pound moles) maintained at a temperature of 71° C. were added quickly 262 pounds of borax pentahydrate (0.92 pound mole by assay) and 146 pounds of liquid sodium silicate A. The reactor was then heated with continual stirring to 116° C. and maintained at this temperature for 5 hours, after which it was cooled to 71° C., the solid removed by filtration, washed with water, and dried.

The resulting product had the following characteristics:
Average particle diameter, as determined on the Fisher Sub-Sieve sizer, was 2.85 microns.
Chemical analysis, precent by weight:
BaO 61.78; $B_2O_3$ 26.26; $SiO_2$ 8.36; $H_2O$ 7.68; Na 0.43; S 0.12.
Ratio of $BaO:B_2O_3$ by weight in product: 2.35:1.

Fifty (50) grams of this product was mixed with 400 milliliters of distilled water, shaken for 24 hours at 28° C., filtered and the clear filtrate analyzed for BAO, $B_2O_3$, and $SiO_2$, and its pH was determined. The solid on the filter was then mixed again with 400 milliliters of distilled water and shaken again for a 24 hour period and this extraction procedure was repeated 20 times with the following results:

| Extraction No. | BaO | B₂O₃ | SiO₂ | pH |
|---|---|---|---|---|
| | Grams per 100 milliliters of solution | | | |
| 1 | 0.13 | 0.068 | 0.014 | 10.2 |
| 2 | 0.10 | 0.046 | 0.017 | 10.4 |
| 3 | 0.088 | 0.036 | 0.020 | 10.4 |
| 4 | 0.092 | 0.042 | 0.021 | 10.4 |
| 5 | 0.11 | 0.044 | 0.022 | 10.6 |
| 6 | 0.11 | 0.052 | 0.023 | 10.6 |
| 7 | 0.11 | 0.045 | 0.024 | 10.7 |
| 8 | 0.11 | 0.049 | 0.026 | 10.6 |
| 9 | 0.11 | 0.047 | 0.022 | 10.3 |
| 10 | 0.11 | 0.046 | 0.021 | 10.6 |
| 11 | 0.11 | 0.046 | 0.021 | |
| 12 | 0.098 | 0.038 | 0.021 | 10.3 |
| 13 | 0.099 | 0.040 | 0.022 | 10.4 |
| 14 | (¹) | (¹) | (¹) | |
| 15 | 0.091 | 0.036 | 0.023 | 10.4 |
| 16 | 0.094 | 0.037 | 0.024 | |
| 17 | 0.11 | 0.043 | 0.024 | 10.2 |
| 18 | 0.11 | 0.043 | 0.028 | 10.3 |
| 19 | 0.10 | 0.040 | 0.026 | 10.3 |
| 20 | 0.094 | 0.038 | 0.024 | 10.2 |
| Average (No. 2 to 20) | 0.102 | 0.043 | 0.022 | |

¹ Not analyzed.

The consistency of the foregoing results, which are typical of those of all products made in accordance with the processes of this invention and which are well within allowable limits of experimental error, indicate the silica coated product in this respect to have attributes of a chemical compound, although the chemical reactivity of the substances extracted indicate them to be a mixture of barium metaborate and silica.

*Example 7*

To a flask provided with a stirrer were added with stirring 600 grams of a 16.20 percent solution of barium sulfide (equivalent to 0.574 mole of BaS), 82.1 grams of technical borax pentahydrate which, based on its assay, was equivalent to 0.287 mole of $Na_2B_4O_7 \cdot 5H_2O$, and 454 grams of a solution of active silica prepared by deionization with Dowex 50W-X12 ion-exchange resin of a solution of liquid sodium silicate A diluted with water in such amount as to provide a solution containing 2.5 percent by weight of silica. This mixture was heated with continual stirring at 100° C. for a period of 3 hours, after which it was cooled to 70° C., and filtered through a Buechner funnel.

The washed wet filter cake thus separated weighed 371 grams, which when dried at 150° C. for 4 hours, weighed 126 grams. Analysis of this product gave the following results:

BaO 58.9; $B_2O_3$ 24.8; $SiO_2$ 9.4; $H_2O$ 6.58; Na 0.12. Ratio of BaO:$B_2O_3$ by weight: 2.37:1.

The product of this example closely resembled in appearance and characteristics the product of Example 2.

Extraction of the product with water, in the same manner as described hereinbefore in Example 2, gave the following results:

| | First extract, grams per 100 milliliters | Second extract, grams per 100 milliliters |
|---|---|---|
| BaO | 0.163 | 0.140 |
| B₂O₃ | 0.073 | 0.074 |
| SiO₂ | 0.012 | 0.012 |
| Na | 0.003 | 0.002 |
| pH of extract | 10.2 | 10.1 |

Although the product contained sodium, the sodium undoubtedly came from the borax that was used, since the silica in this example was introduced in deionized form as active silica. The amount found in the product is less than that obtained in any of the preceding examples in which liquid sodium silicate had been used.

EXAMPLES 8-12

In these examples a series of experiments were run in which various mixtures each comprising 92 grams of barium metaborate, water, and a different form of silica were refluxed for a period of 6 hours. At the end of that period the products were recovered by filtration and dried. The experiments, together with the results, are summarized in the following table:

| Ex. | Form of silica | Grams of SiO₂ used | Grams of H₂O used | Percentage BaO in filtrate | Percentage B₂O₃ in filtrate |
|---|---|---|---|---|---|
| 8 | Amorphous | 8.0 | 250 | 0.278 | 0.399 |
| 9 | Silicic acid | 8.0 | 250 | 0.120 | 0.237 |
| 10 | Silica gel | 11.3 | 250 | | |
| 11 | Colloidal, suspension (Syton 200) | 8.0 | 300 | 0.169 | 0.280 |
| 12 | Colloidal powder | 8.0 | 300 | 0.158 | 0.326 |

Extracting the dried products of Examples 8-12 with water gave the following results:

| Example | First extraction | | | Second extraction | | |
|---|---|---|---|---|---|---|
| | BaO | B₂O₃ | Total | BaO | B₂O₃ | Total |
| 8 | 0.203 | 0.104 | 0.037 | 0.194 | 0.097 | 0.291 |
| 9 | 0.188 | 0.093 | 0.281 | 0.156 | 0.077 | 0.233 |
| 10 | 0.156 | 0.083 | 0.239 | 0.152 | 0.076 | 0.228 |
| 11 | 0.155 | 0.085 | 0.240 | 0.142 | 0.077 | 0.219 |
| 12 | 0.176 | 0.092 | 0.268 | 0.163 | 0.082 | 0.235 |

The data of these tables demonstrate that a satisfactory product can be prepared using any of the various forms of silica listed.

EXAMPLE 13

In this example, 50 grams each of barium silicate and barium metaborate with sufficient water to give a workable slurry were refluxed for a period of 6 hours. The product was recovered by filtration and dried. Solubility characteristics of the product were as follows:

| | Percentage BaO | Percentage B₂O₃ | Total |
|---|---|---|---|
| First extraction | 0.146 | 0.072 | 0.218 |
| Second extraction | 0.107 | 0.044 | 0.151 |

EXAMPLE 14

The procedure of Example 13 was modified to the extent that molar quantities of the components listed below in the equation were admixed with sufficient water to give a workable slurry, after which the mixture was refluxed for a period of 20 hours.

$4(BaO \cdot B_2O_3) + Na_2B_4O_7 \cdot 5H_2O + 2(BaO \cdot SiO_2)$
$\rightarrow 2(3BaO \cdot 3B_2O_3 \cdot SiO_2) + 4H_2O + 2NaOH$ At the end of the reaction period the product was recovered by filtration, after which it was dried. Solubility characteristics of the product were as follows:

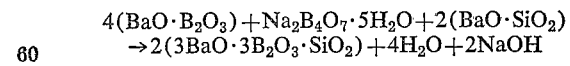

| | Percentage BaO | Percentage B₂O₃ | Total |
|---|---|---|---|
| First extraction | 0.171 | 0.107 | 0.278 |
| Second extraction | 0.096 | 0.055 | 0.151 |
| Third extraction | 0.140 | 0.085 | 0.225 |

EXAMPLE 15

In this example, the procedure of Example 13 was followed with the exception that the barium silicate used in the process was ground before the reaction. The reaction is summarized in the following equation:

$$4(Ba(OH)_2 \cdot 8H_2O) + 2(BaO \cdot SiO_2) + 3(Na_2B_4O_7 \cdot 5H_2O)$$
$$\rightarrow 2(3BaO \cdot 3B_2O_3 \cdot SiO_2) + 6NaOH + 48H_2O$$

As before, the product was recovered by filtration, dried, and solubility determinations made. Solubility values were as follows:

|                  | Percentage BaO | Percentage $B_2O_3$ | Total |
|------------------|----------------|---------------------|-------|
| First extraction | 0.102          | 0.033               | 0.135 |
| Second extraction| 0.077          | 0.020               | 0.097 |

*Examination of Products for Crystal Growth Tendencies*

Powdered samples of silica coated barium metaborate from Examples 2, 3, 4, and 6, and commercial grades of hydrated barium metaborate, barium tetraborate, and barium sesquiborate, and barium borosilicate which was prepared by fusion in the laboratory, were each treated as follows:

(1) One gram of particles of each solid was mixed with 10 milliliters of distilled water in a stoppered test tube and maintained at 37° C.

(2) One gram of particles of each solid was mixed with 10 milliliters of distilled water, the mixture was heated to 70° C., and 0.2 milliliter of concentrated 28-percent ammonia solution was added, the test tube was stoppered and allowed to stand at room temperature.

(3) One gram of particles of each solid was mixed with 10 milliliters of distilled water in a stoppered test tube and the mixture was heated to 100° C. each day and then allowed to cool and stand at room temperature until the following day.

Each of the tubes and their contents was examined periodically during a period of three weeks.

The silica coated barium metaborate samples, when examined with a microscope under polarized light, contained some visible crystalline material having a size less than 5 microns in diameter. After three weeks, as outlined in each of the 3 treatments above, all samples of silica coated barium metaborate were essentially unchanged in size or character when examined under a microscope.

The uncoated barium metaborate particles had a diameter less than 5 microns before being treated with water but, after three weeks, a great number of crystals having a diameter in excess of 100 microns appeared in each tube.

The barium sesquiborate particles had a diameter less than 5 microns before being treated with water but, after three weeks, a great number of crystals having a diameter in excess of 100 microns was present in each tube.

The barium tetraborate particles included small crystals less than 20 microns in diameter before being treated with water, but, after three weeks, a great number of crystals having a diameter in excess of 100 microns was present in each tube.

The fused barium borosilicate sample was a glassy solid which had been ground so that its particles passed a 100-mesh screen. After three weeks of treatment, the particles were still primarily glassy but a few large crystals which had a size in excess of 200 microns in diameter were found by microscopic examination in each tube.

*Comparative Examples*

A series of experiments were performed to establish factors that affect the character and type of coating deposited on barium borates. In each of these experiments, 92 grams of solid barium metaborate particles (or 64 grams of barium sesquiborate) was suspended in 325 milliliters of water, to each of which was then added 8 grams of silica in the form of a liquid sodium silicate A, and, in one case (IV), liquid sodium silicate B (having a ratio of $Na_2O:SiO_2$ of 1:3.22), and, in the case of barium sesquiborate, 5.4 instead of 8.0 grams of silica in the form of liquid sodium silicate A.

The mixtures were then further treated as follows:

(I) Stirred 2 hours at room temperature and the entire mixture dried in an oven at 105° C.

(II) Stirred 2 hours at room temperature and the entire mixture was evaporated to dryness by heating at 50° C. at a subatmospheric pressure.

(III) Stirred 2 hours at room temperatures, filtered on a Buechner funnel, washed with water and the wet cake dried at 105° C. in an oven.

(IV) Same as I but liquid sodium silicate B ($Na_2O$:3.22$SiO_2$) was used instead of liquid sodium silicate A.

(V) Mixture was heated under reflux for a period of 2 hours and then evaporated and dried in an oven at 105° C.

(VI) Same as I but barium sesquiborate (64 grams) and 5.4 grams of silica in the form of liquid sodium silicate A were used.

The sodium content of each of these products and the analysis of each of their first aqueous extracts are included in the following table:

| Experiment | I | II | III | IV | V | VI |
|---|---|---|---|---|---|---|
| Analysis of first extract, grams per 100 ml.: | | | | | | |
| BaO | 0.273 | 0.460 | 0.314 | 0.352 | 0.262 | 0.413 |
| $B_2O_3$ | 0.140 | 0.220 | 0.161 | 0.167 | 0.156 | 0.296 |
| $SiO_2$ | 0.013 | 0.017 | 0.016 | 0.010 | 0.009 | 0.020 |
| Na | 0.036 | 0.056 | 0.004 | 0.026 | 0.048 | 0.061 |
| pH | 10.2 | 10.8 | 10.4 | 10.7 | 9.8 | 9.6 |
| Analysis of solid product, Na, percent by weight | 1.96 | 1.19 | 0.19 | 1.50 | 1.58 | 0.96 |

From the foregoing results, it is apparent that in none of these experiments was a product obtained which was as resistant to extraction or leaching by water and as free from alkali metal as were the products described in the preceding examples, and that heating and washing of the particles are requisites of our processes.

Examples 1 to 15 demonstrate that a satisfactory barium meta-borate-silica pigment can be prepared using barium metaborate or compounds that will form barium metaborate under the experimental conditions used as one reactant and as the other reactant any one of several inorganic compounds containing silicon. Suitable examples of the latter include: amorphous silica, silicic acid, silica gel, colloidal silica suspension, colloidal silica powder, barium silicate, and sodium silicate.

It is not apparent as to just why a satisfactory pigment can be produced using these different inorganic compounds containing silicon as their properties, particularly solubility, vary greatly. As for example, of these compounds sodium silicate is very soluble in water while the others are difficultly soluble. Specifically these compounds other than sodium silicate are generally classified as insoluble in water; definitely less than 1 part in 100 parts of water. As another difference, pH values of water solutions of these compounds vary as illustrated in the following table:

| Compound | pH |
|---|---|
| Amorphous $SiO_2$ | 7.95 |
| Silicic acid | 6.55 |
| Silica gel | 7.15 |
| Colloidal $SiO_2$ suspension | 9.80 |
| Colloidal silica powder | 8.75 |
| Barium silicate | 11.10 |
| Sodium silicate solution, 25.3 pct. $SiO_2$ 6.75 pct. $Na_2O$ | 11.10 |

The foregoing pH values were determined on an extract from a mixture containing 10 grams of an amount of each material containing 10 grams $SiO_2$ mixed with 100 milliliters of water.

This application is a continuation-in-part of our copending application Serial No. 859,104, filed December 14, 1959, now U.S. Patent 3,033,700 issued May 8, 1962, entitled Silica-Coated Barium Metaborate Pigments and Processes of Producing the Same.

While particular embodiments of the invention have been described, it will be understood, of course, that the invention is not so limited, since many modifications may be made thereto. As for example, a satisfactory product can be prepared wherein 3 parts of barium metaborate is used per part of barium silicate rather than equal quantities of those two components, as given in the specific example. Likewise, satisfactory products may be produced by the methods described in Examples 14 and 15 wherein the quantities of the several components used in those examples are varied. Other modifications will be apparent to those skilled in the art. It is, therefore, contemplated to cover by the appended claims any such modifications as fall within the true spirit and scope of the invention.

The invention having thus been described, what is claimed and desired to be secured by Letters Patent is:

1. A silica-coated barium metaborate pigment in particulate form having an effective diameter of less than 40 microns, comprising hydrated barium metaborate hydrogen bonded to a polymerized amorphous hydrated silica containing both Si—O—Si and Si—OH bonds wherein the amount of silica varies from 3 to 25 percent based on the weight of the barium metaborate.

2. A silica-coated barium metaborate pigment in particulate form having an effective diameter of less than 40 microns, comprising hydrated barium metaborate hydrogen bonded to a polymerized amorphous hydrated silica containing both Si—O—Si and Si—OH bonds, wherein the BaO content, $B_2O_3$ content, and the silica content varies from 50 to 65 parts, 20 to 30 parts, and 3 to 20 parts respectively.

3. A silica-coated barium metaborate pigment in particulate form having an effective diameter of less than 40 microns, comprising hydrated barium metaborate hydrogen bonded to a polymerized amorphous hydrated silica containing both Si—O—Si and Si—OH bonds, wherein the BaO content, $B_2O_3$ content, and the silica content varies from 50 to 65 parts, 20 to 30 parts, and 3 to 20 parts respectively, characterized in that the solubility of said pigment is between 0.1 and 0.3 part per 100 parts of water at 25° C.

4. The pigment as defined in claim 3, which when extracted to saturation with water at 25° C. yields an extract that contains between 0.05 and 0.20 percent of barium expressed as BaO, between 0.023 and 0.091 percent boron expressed as $B_2O_3$, and at least 0.005 percent of silica, all being percentages by weight.

5. A process for the production of a silica-coated barium metaborate pigment in particulate form which comprises mixing an inorganic compound containing silicon selected from the group consisting of amorphous silica, silicic acid, silica gel, colloidal silica suspension, colloidal silica powder, and barium silicate with barium metaborate particles in an aqueous medium, said silicon containing compound in a proportion computed as silica between 3 and 25 percent by weight of the barium metaborate, heating the mixture at a temperature varying from 75 to 200° C. for a period of time equal to at least about 30 minutes to deposit upon the barium metaborate particles a coherent layer consisting essentially of amorphous hydrated silica that is pervious to water, and subsequently separating the particulate solid product from the aqueous medium and drying the same.

6. The process of claim 5 wherein the inorganic compound containing silicon is amorphous silica.

7. The process of claim 5 wherein the inorganic compound containing silicon is silicic acid.

8. The process of claim 5 wherein the inorganic compound containing silicon is silica gel.

9. The process of claim 5 wherein the inorganic compound containing silicon is colloidal silica suspension.

10. The process of claim 5 wherein the inorganic compound containing silicon is colloidal silica powder.

11. The process of claim 5 wherein the inorganic compound containing silicon is barium silicate.

References Cited in the file of this patent

UNITED STATES PATENTS

| | | |
|---|---|---|
| 2,296,637 | Hanahan | Sept. 22, 1942 |
| 2,357,089 | Daiger | Aug. 29, 1944 |
| 2,357,721 | Allan | Sept. 5, 1944 |
| 2,818,344 | Buckman | Dec. 31, 1957 |
| 2,885,366 | Iler | May 5, 1959 |

FOREIGN PATENTS

| | | |
|---|---|---|
| 448,274 | Great Britain | 1938 |

UNITED STATES PATENT OFFICE
CERTIFICATE OF CORRECTION

Patent No. 3,060,049            October 23, 1962

Stanley J. Buckman et al.

It is hereby certified that error appears in the above numbered patent requiring correction and that the said Letters Patent should read as corrected below.

Column 2, line 13, after "parts", first occurrence, insert a comma; line 21, for "percipitation" read -- precipitation --; column 3, line 46, for "proceedeing" read -- proceeding --; column 4, line 55, for "metaborates" read -- metaborate --; column 7, line 31, for "equavalent" read -- equivalent --; column 8, line 66, for "precent" read -- percent --; line 72, for "BAO" read -- BaO --; column 10, first table thereof, heading to the third column, for "Grams of $SiO^2$ used" read -- Grams of $SiO_2$ used --; same column, table 2, fourth column thereof, line 1, for "0.037" read -- 0.307 --; same table 2, seventh column thereof, line 5, for "0.235" read -- 0.245 --; column 12, line 73, strike out "a mixture containing 10 grams of".

Signed and sealed this 19th day of March 1963.

(SEAL)
Attest:

ESTON G. JOHNSON            DAVID L. LADD
Attesting Officer            Commissioner of Patents